Figure 1:
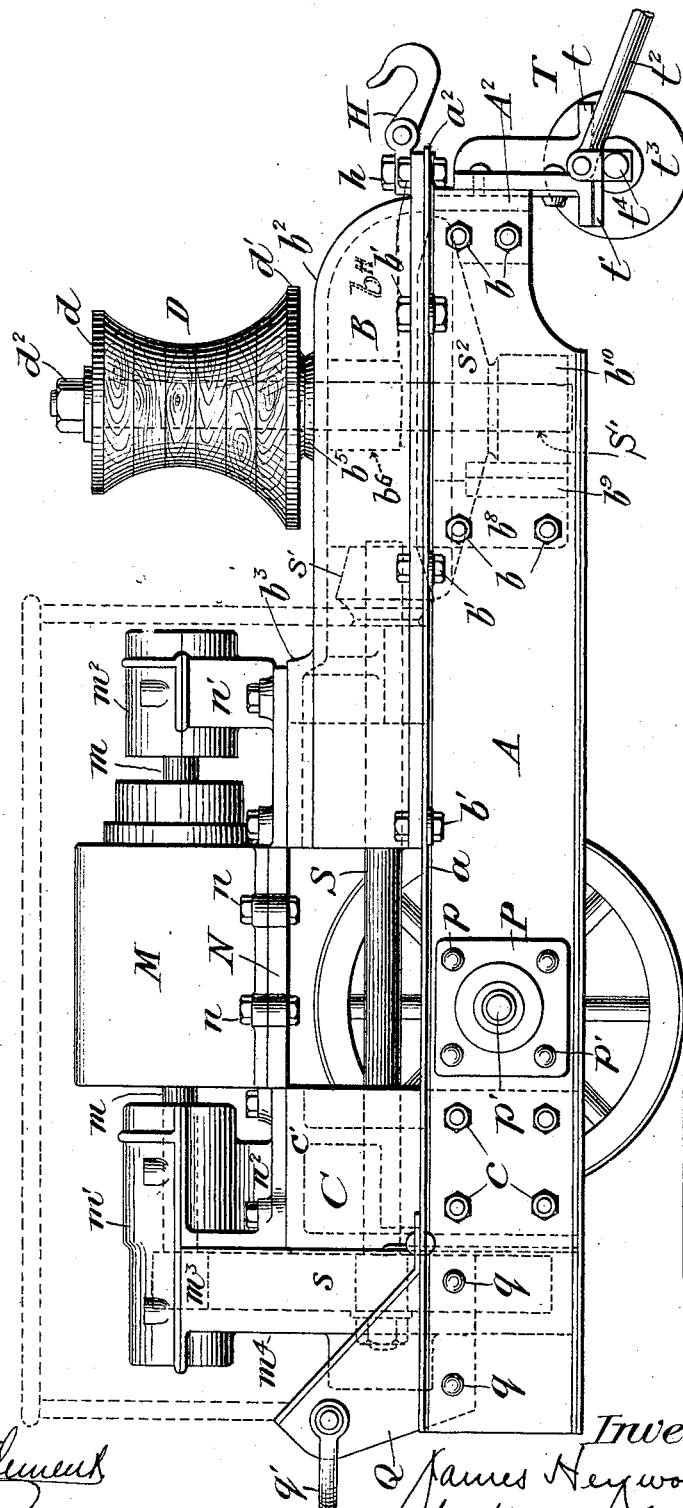

No. 773,867. PATENTED NOV. 1, 1904.
J. HEYWOOD.
PORTABLE ELECTRIC WINCH.
APPLICATION FILED MAR. 14, 1904.
NO MODEL. 2 SHEETS—SHEET 2.

Witnesses: Inventor:

No. 773,867.                                             Patented November 1, 1904.

UNITED STATES PATENT OFFICE.

JAMES HEYWOOD, OF PHILADELPHIA, PENNSYLVANIA.

PORTABLE ELECTRIC WINCH.

SPECIFICATION forming part of Letters Patent No. 773,867, dated November 1, 1904.

Application filed March 14, 1904. Serial No. 198,077. (No model.)

*To all whom it may concern:*

Be it known that I, JAMES HEYWOOD, a citizen of the United States, residing in the city and county of Philadelphia, State of Pennsylvania, have invented a certain new and useful Portable Electric Winch, of which the following is a specification.

My invention relates to winches, and has for its object the production of a machine of this class which can be safely and advantageously used for the drawing in of electric cable into conduits and the like.

My invention consists, essentially, of a strong frame mounted on wheels and so designed as to be anchored at one end and to safely take a heavy strain at the other. Upon this frame I place a drum, preferably vertical, an electric motor bolted to the frame and geared to the drum, together with a switch or controller of suitable design mounted in convenient position to be quickly and easily manipulated from behind the machine. To this outfit I add a rod or rods carrying conducting-wires and clamps to be lifted up and hooked over the trolley-wires when the work is along the line of a traction-road. I do not limit myself to this means of obtaining current, but find it convenient. The motor I employ is a series-wound machine which increases its torque by increase of current due to falling off of counter electromotive force as the load increases and speed diminishes. The torque is thus proportional to the load.

The machine is very compact, is readily moved about and transported, and consumes no power when not in use. Moreover, it requires no skilled attendant, and by having the different parts properly incased it can be used in all weathers and under the most trying conditions.

My invention is illustrated in the accompanying drawings, wherein—

Figure 2:
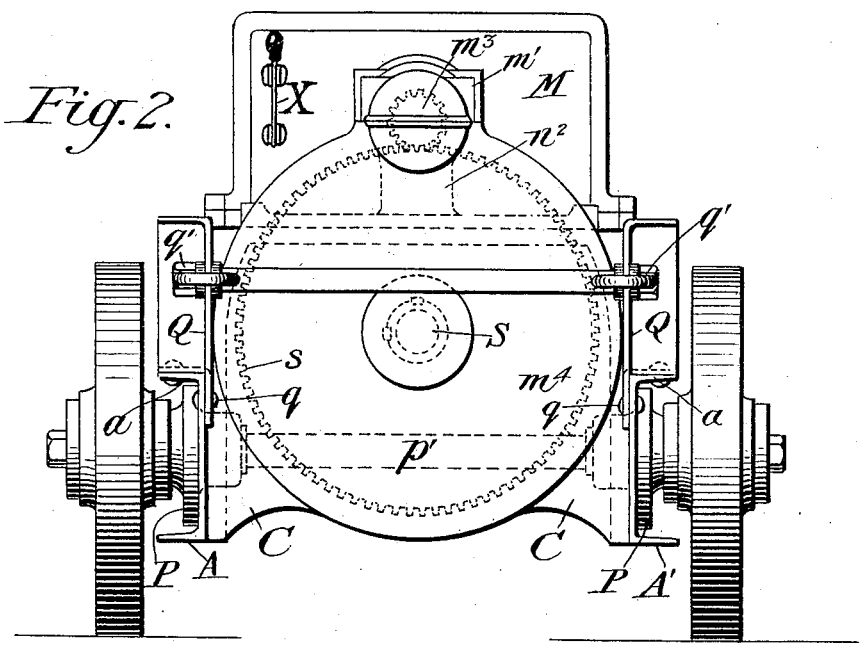

Figure 1 is a side view of the device, the near wheels being removed. Fig. 2 is a rear view thereof, and Fig. 3 is a sectional view of the cast bed-plate upon which the winding-drum is mounted.

Referring to the drawings, A A' are side members constructed of channel-iron and secured together by the transverse members B and C, these being bolted to the channels, as shown at $b$ and $c$, respectively. In addition the member B, which is in effect a bolster or bed-plate for the winding-drum, arches across the flange $a$ and is bolted thereto at $b'$. The front of the bolster B drops to the upper flange $a^2$ of a front transverse member $A^2$, and secured thereto by the bolt $h$ is a hook H, used for draft purposes or the like. To the transverse web $A^2$ is secured the bearing-plate $t$ for the front or guiding truck T. This has the lower plate $t'$, the tongue $t^2$, the wheels $t^3$, and the axle $t^4$.

Figure 3:
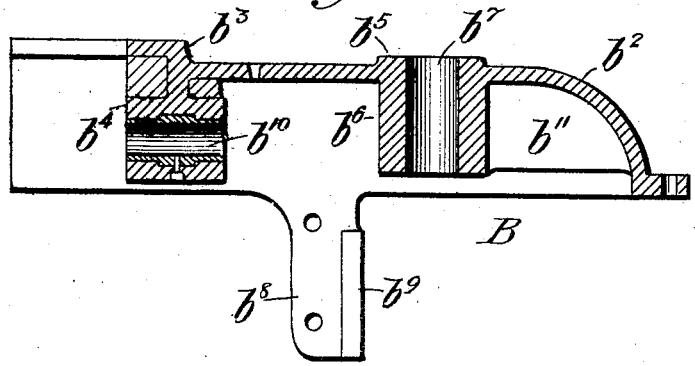

The casting B, which is separately shown in section in Fig. 3, constitutes an important feature of my design. It has a raised portion $b^3$, constituting a bed-plate for the bolster N, to which is secured by bolts $n$ the electric motor M. It also has a raised portion $b^5$, with its upper face trued off to afford a bearing-face for the drum D. A hollow boss $b^6$ is produced in the casing, strengthened by the web $b^{11}$ connecting it to the front wall $b^2$ and bored out at $b^7$ for the reception of the vertical shaft S' of the drum. The drop member $b^8$ of the casting extends the full width of the machine and receives the bolts $b$ passing through the webs of the channel-irons A and A'. In addition it carries the bearing $b^{10}$ for the shaft S', the shaft being inserted from beneath, and this serving as a "foot-step" to carry the weight of the gears, &c., if drum D is removed.

Mounted also on the bolster N at opposite ends are the journal-blocks $n'$ and $n^2$, upon which are supported the boxes $m'$ and $m^2$, carrying the bearings for the motor-shaft $m$. Upon the rear end of this shaft is a pinion $m^3$, meshing with a toothed wheel $s$, carried upon the rear end of the longitudinal shaft S. This shaft is journaled at its forward end in a bearing $b^{10}$, supported in a drop extension $b^4$ of the casting B, and at its rearward end the shaft is journaled in a similar bearing in the casting C. This casting has an upper face $c'$ in the same plane with the face $b^3$, serving therewith to support the bolster N. To the rear of the casting C lies the gear-wheel $s$, and this is inclosed, together with the pinion, by a suitable casting $m^4$. At the forward end of the shaft S is a bevel-pinion $s'$, and meshing with this is a horizontal bevel-gear $s^2$, secured to the lower end of the vertical shaft S'. The upper end of this shaft is threaded, and below that it is squared. The drum D has cast-iron heads $d$ and $d'$, each with a squared hole, the body of the drum being confined between these heads and made up, preferably, of sections each having a squared hole to fit the shaft. In assembling, the shaft S', with the beveled gear $s^2$ secured on it, is inserted through the casting from below, the collar or step-bearing $b^{10}$ is then put in position and bolted fast, and finally the parts of the drum D are slipped down over the shaft and secured by the nut $d^2$.

At the rear end of the machine I provide two oblique angle-plates Q, bolted to the side channels at $q$ and carrying the clevises $q'$, secured by bolts in the usual manner and intended to be used for anchoring the machine during operation. These angle-plates are raised above the side plate so as to bring the clevises $q'$ approximately in the same place as the base of the drum. Upon each side channel-iron a plate P is bolted at $p$, being perforated for the passage of the axle $p'$.

The operation of my invention is as follows: The machine having been moved in proximity to the drawing-out manhole, the drag-rope is passed up over the usual sheaves and then horizontally to the drum D, around which it is given a few turns, and the end retained by the workman, who stands ready to take up slack. A suitable cable is passed around a post or other secure anchorage and the ends are attached to the clevises $q'$. By manipulating the controller X (see Fig. 2) the attendant then admits current to the motor, connection having previously been made, as already described, to the trolley-wire or other source of supply. The movement of the armature of motor M is imparted, through its shaft $m$ and the pinion $m^3$, to the gear-wheel $s$ and the shaft S. From this it is communicated by bevel-gears $s'$ and $s^2$ to the shaft S' and thence to the drum D. As the drum turns it draws in the cable, and after a little practice the attendant who keeps the rope taut can tell almost as well by feeling the condition of the cable as by the signals from the other manhole. It follows from this also that the strain on the rope is easily regulated by permitting more or less "slip" around the drum.

As shown in Fig. 1, the working parts of my machine are usually housed in a casing indicated by dotted lines. The gears are all incased, and even the journal-boxes can be inclosed to exclude dust and moisture.

I am aware that many changes may be made in matters of detail without departing from the spirit of my invention, and all such changes I consider as fairly included within the scope of my claims.

Having thus described my invention, what I claim, and desire to secure by Letters Patent of the United States, is—

1. A portable electric winch comprising the following instrumentalities: a truck having side frames of channel-beams and cross members of arched form strengthened by flanges in the direction of thrusts, an electric motor and winding-drum mounted on said truck, the forward arched member of which is provided with a vertical bearing and a winding-shaft in said bearing, a longitudinal driving-shaft and gears connecting the drum and motor, bearings for said shaft formed in drop members formed on the under side of the arched cross members of the truck, substantially as described.

2. In a portable winch, a bed-plate composed of an arched portion, a hollow boss formed therein for the vertical shaft, a second hollow boss for the horizontal shaft, a brace or flange for the "foot-step" bearing, and connecting-webs, whereby the alinement and enmeshing of shafts and gears is rendered certain under all conditions, substantially as described.

In witness whereof I have hereunto set my hand in the presence of two witnesses.

JAMES HEYWOOD.

Witnesses:
JAMES H. MARR,
EDWARD E. CLEMENT.